United States Patent Office 3,642,720
Patented Feb. 15, 1972

3,642,720
TRIAZINE BASED POLYBENZIMIDAZOLE
Raymond J. Kray, Berkeley Heights, N.J., and Roland A. E. Winter, Armonk, N.Y., assignors to Ciba-Geigy Corporation, Ardsley, N.Y.
No Drawing. Filed Apr. 30, 1970, Ser. No. 33,528
Int. Cl. C08g 33/02
U.S. Cl. 260—78.4 R      15 Claims

ABSTRACT OF THE DISCLOSURE

Triazine based polybenzimidazoles are prepared by reacting aromatic tetramines with s-triazine compounds containing at least two alkyl or aryl carboxylic acid groups or their alkyl or aryl esters. The triazine based polybenzimidazoles can be molded and their solutions can be used to form stiff and tough coatings, films and fibers. These polymers possess high temperature oxidative stability and good mechanical properties.

DETAILED DESCRIPTION

The present invention relates to novel polybenzimidazole condensation polymers which are characterized by a recurring unit having the following structural formula:

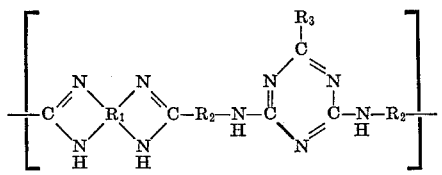

wherein:

$R_1$ is a tetravalent radical containing at least one ring of six carbon atoms, said ring characterized by benzenoid unsaturation, the four amino groups being attached directly to separate carbon atoms in a 6-membered benzenoid ring of the $R_1$ radical and each pair of amino groups being attached to adjacent carbon atoms in a ring of the $R_1$ radical;

$R_2$ is a divalent aromatic, aliphatic, or cycloaliphatic radical;

$R_3$ is hydrogen, amino, chloro, diaryl amino, di(lower)alkyl amino, dialkenylamino, alkylarylamino, anilino, phenyl or N-phthalimido.

The (lower) alkyl group employed herein means a straight or branched chain alkyl group having up to four carbon atoms. Examples of such groups are methyl, ethyl, propyl, isopropyl, butyl and the like.

The divalent aromatic and aliphatic radicals which can be present as $R_2$ can have up to about 20 carbon atoms. Illustrative examples of the aromatic groups are the divalent radicals of benzene, naphthalene, anthracene and the alkyl substituted derivatives of said groups such as methyl, ethyl, butyl, isopropyl derivatives. Illustrative examples of the aliphatic groups are the divalent radicals methylene, ethylene, isobutylene, hexylene, pentylene, decylene, eicosylene, 3-methylhexylene and the like.

The polybenzimidazoles of the present invention are fusible, have exceptional stability to heat, high tensile properties and good resistance to water, acids and bases. Thus these polymers are particularly useful in making fibers, protective coatings, binders for glass cloth, graphite and boron fibers, adhesives and molding compounds.

The starting materials employed in the preparation of these polybenzimidazoles are s-triazine compounds containing two alkyl, aryl or cycloalkyl carboxylic acid groups or their alkyl and aryl esters, and aromatic tetramines.

The triazine based dicarboxylic acids and dicarboxylic acid esters are characterized by the formula:

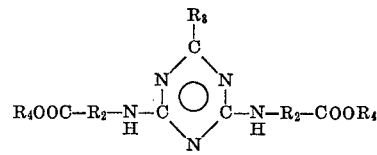

wherein:

$R_2$ and $R_3$ are as defined above, and
$R_4$ can be hydrogen, alkyl groups having up to 6 carbon atoms, phenyl and the like.

Preferably $R_2$ is selected from the following groups:

(a) ortho, meta, and para phenylene, biphenylene, naphthylene and anthrylene.

(b) 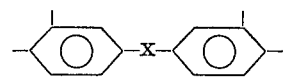

wherein X is sulfur, oxygen, sulfone, alkylene having up to four carbon atoms or alkyl or aryl substituted alkylene groups.
(c) alkylene groups from 1 to 10 carbon atoms.
(d) cycloalkyl groups such as cyclopentyl, cyclohexyl and the like.

The blocking group $R_3$ mentioned above can be hydrogen, chloro, phenyl or an amino group illustrated below:
—$NH_2$, diphenyl amino, dialkylamino such as, dimethyl amino, diethyl amino, dipropylamino, diisopropylamino, dibutylamino and the like, anilino, N-(lower)-alkylanilino compounds such as N-methylanilino, N-ethylanilino, N-butylanilino, N-arylanilino compounds such as N-naphthylanilino, N-phenylanilino and the like.

The substituents on the phenyl blocking group can be nitro, halo, especially chloro or bromo, carboxyl, cyano, alkyl especially methyl, ethyl and propyl or aryl groups.

The following s-triazine compounds exemplify a few types of dicarboxylic acids or esters that can be employed in preparing the polybenzimidazoles of this invention:

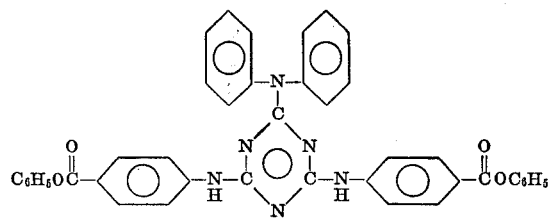

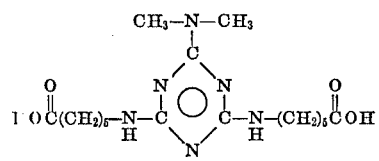

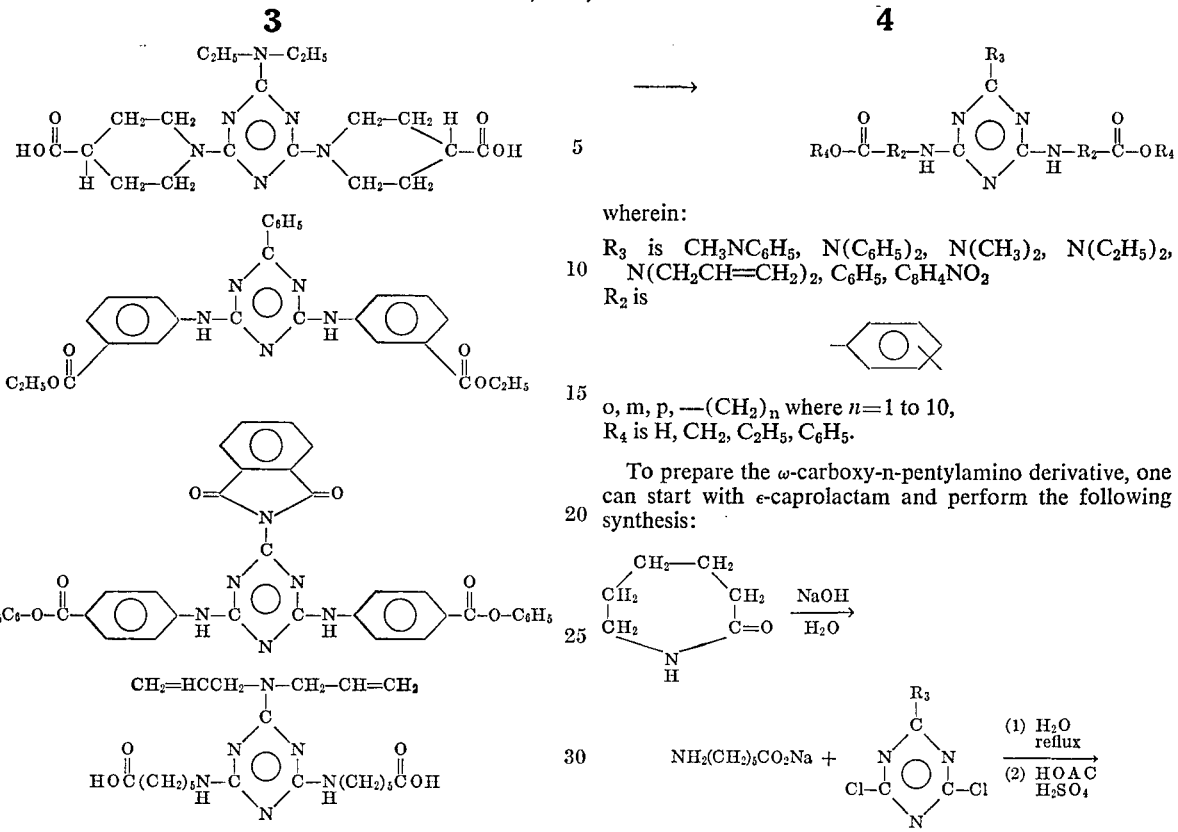

The s-triazine dicarboxylic acids and esters of the present invention are prepared in several steps as exemplified below:

Scheme I.—Reaction to obtain substituted amino blocking groups

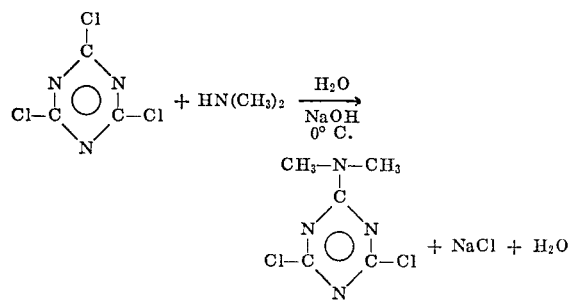

Other secondary amines that can be used are:

$HN(C_2H_5)_2$, $HN(CH_2CH=CH_2)_2$

The temperature must be maintained at 0° C.±10° C.; otherwise more than one chlorine per triazine nucleus will react. A molar excess of secondary amine can be used in place of NaOH to scavenge the HCl liberated in the reaction.

To form the phthalimido blocking group, react cyanuric chloride with potassium phthalimide in acetone at about 25° C. for a period of 20 hours. An exact procedure is given by W. F. Beech, J. Chem. Soc., C, 466–472, 1967.

The 2-phenyl-4,6-dichloro-s-triazine is obtained commercially from Badische Anilin- und Sodafabrik AG (BASF).

Scheme 2.—Reaction to obtain the diacid or the diester group

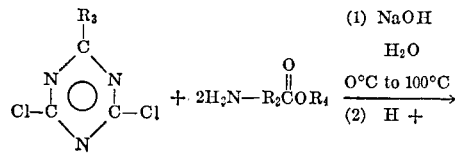

wherein:

$R_3$ is $CH_3NC_6H_5$, $N(C_6H_5)_2$, $N(CH_3)_2$, $N(C_2H_5)_2$, $N(CH_2CH=CH_2)_2$, $C_6H_5$, $C_8H_4NO_2$
$R_2$ is

o, m, p, —$(CH_2)_n$ where $n=1$ to 10,
$R_4$ is H, $CH_2$, $C_2H_5$, $C_6H_5$.

To prepare the ω-carboxy-n-pentylamino derivative, one can start with ε-caprolactam and perform the following synthesis:

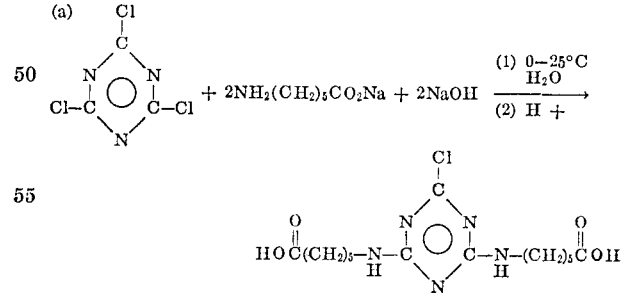

To prepare the phenyl esters for the aromatic dicarboxylic acid derivatives, an ester exchange of the alkyl diester can be performed, in the presence of $Ti(OBu)_4$ or $NaOCH_3$.

Scheme 3.—Reaction to obtain the Cl and $NH_2$ blocking group and the diacid group (a)

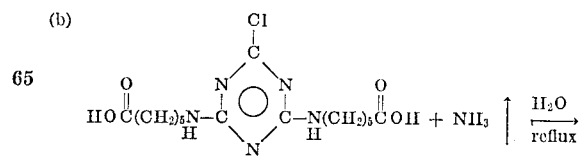

The temperature should not exceed 25° C.; otherwise the third chlorine atom will enter into the reaction.

(b)

Ammonia gas is bubbled into the heated aqueous solution containing the chloro derivative and the desired product is obtained.

Preparation of these compounds is described in greater detail in copending application Ser. No. 33,527.

The tetramines in this invention are characterized by the general formula:

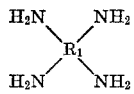

wherein the tetravalent radical

is defined above. The $R_1$ groups may be characterized by the following structures:

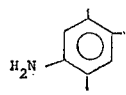 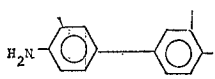

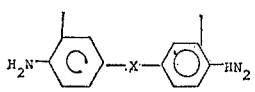 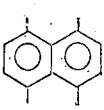

wherein X is O, S, $SO_2$ or $CH_2$.

The preferred aromatic tetramines are those in which the nitrogen atoms of each pair of amino groups are directly attached to ortho carbon atoms of the R group.

The following species are typical tetramines suitable in this invention:

3,3'-diaminobenzidine
3,3',4,4'-tetraminodiphenylether
1,2,4,5-tetraminobenzene
3,3',4,4'-tetraminodiphenylmethane
3,3',4,4'-tetraminodiphenyl sulfone.

The condensation reaction to form the polybenzimidazoles occurs on heating equivalent amounts of tetramines and the dicarboxylic acids and esters of dicarboxylic acids, to temperatures of 100° C. to 450° C. in the absence of oxygen.

More specifically, the reaction can be carried out conveniently in the following ways.

(a) Formation of a prepolymer by a first stage melt polymerization under nitrogen at atmospheric pressure and a second-stage solid state polymerization under high vacuum.

(b) Formation of the polymer by melt polymerization under a continuous sweep of nitrogen for both first and second stages of polymerization. One can also stop the reaction at first prepolymer stage and continue the reaction during fabrication.

(c) Polymerization in polyphosphoric acid under nitrogen atmosphere at approximately 220° C.

(d) Polymerization in a high boiling solvent such as silicone oil or chlorinated biphenyl to form a prepolymer. The polymerization can be continued during fabricated or by further heating in the melt or in the solid state under an inert atmosphere.

Since the s-triazine containing polybenzimidazoles are soluble in such solvents as dimethylacetamide, dimethylformamide, dimethylsulfoxide and the like, solutions of these polymers can be used to impregnate reinforcing fibers and fabrics like glass, boron, metal oxide whiskers and graphite. These prepregs when cured form rigid laminates or composites which also form strong thermally resistant structural adhesive bonds between aluminum, stainless steel, titanium and other metals. The polybenzimidazoles can also be cast from solutions to yield stiff and tough coatings, films and fibers. On a 100% solid basis, these polymers can be molded into shaped articles.

The polybenzimidazoles of this invention has a high nitrogen content from the s-triazine ring and therefore are also useful as ablative heat shield materials. This stems from the fact that rings containing interstitial nitrogen atoms have lower thermal conductivity than graphite or carbon.

To further illustrate the nature of this invention and the process employed in preparing the triazine-based polybenzimidazoles, the following examples are presented below.

EXAMPLE I 16.07 gm. (0.075 mole) of 3,3'-diaminobenzidine and 28.685 gm. (0.075 mole) of 2-dimethylamino-4,6-bis(ω-carboxy-n-pentylamino)-s-triazine were dry mixed and charged into a polymer tube. The mixture was flushed with nitrogen and heated at approximately 265° C. for a period of 3.5 hours under a nitrogen atmosphere. The polymer thus obtained was found to have an intrinsic viscosity of 0.490 in dimethylsulfoxide (DMSO) at 100° C.

The polybenzimidazole was compression molded into placques at 550° F. and 1000 p.s.i. Micro tensile specimens were cut from the placques with a carbide burr and their tensile strength, percent elongation, and tensile modulus were determined.

The polymer was aged isothermally in a forced air oven at 250° C. The percent weight loss was minor after 90 hours.

EXAMPLE II 16.07 gm. (0.075 mole) of 3,3'-diaminobenzidine and 30.78 gm. (0.075 mole) of 2-diethylamino-4,6-bis(ω-carboxy-n-pentylamino) - s - triazine were dry mixed and charged into a polymer tube. The mixture was flushed with nitrogen and heated at 225° C.–235° C. for approximately 1 hour and 15 minutes under a nitrogen atmosphere. The prepolymer was cooled, crushed and advanced in a polymer tube under a nitrogen atmosphere at 300° C.–310° C. for about 1 to 2 hours. The polymer thus obtained had an intrinsic viscosity of 0.434 in DMSO at 100° C. and a glass transition temperature of 180° C. by torsional braid determination.

Sixteen ply laminates containing 31.2% resin were prepared using 112–112E fiber glass cloth. The laminates were tested for their room temperature flexural strength and flexural modulus.

The laminates were aged isothermally in a forced air oven at 250° C. The percent weight loss was minor after 100 hrs.

Unsupported films which were clear, flexible and tough were also prepared. Ten grams of the polybenzimidazole were dissolved in 90 gm. of DMAC. The resin solution was cast on polyethylene sheet and dried 16 hours in a vacuum at 80° C. After stripping, the unsupported films were cured in a forced air oven at 160° C. for 2 hours. The films were tested for their tensile strength and tensile modulus.

EXAMPLE III

Employing the procedure of Example II, the following reactions were carried out to prepare the corresponding polybenzimidazoles.

(a) 29.830 gm. of 2-dimethylamino-4,6-bis(ω-carboxyethylamino)-s-triazine and 21.426 gm. of 3,3'-diaminobenzidine were reacted together. A moldable polymer was obtained.

(b) 2.614 gm. of 2-dimethylamino-4,6-bis(10-carboxy decylamino)-s-triazine and 1.071 gm. of 3,3'-diaminobenzidine were reacted together. The polymer obtained had an intrinsic viscosity of 0.280 in DMSO at 100° C. The glass transition temperature was 127° C.

(c) 2.7025 gm. of 2 - dimethylamino-4,6-bis(carboxymethylamino)-s-triazine and 2.1426 gm. of 3,3'-diaminobenzidine were reacted together. The polymer obtained had an intrinsic viscosity of 0.111 in DMSO at 100° C.

(d) 4.224 gm. of 2 - dimethylamino-4,6-bis(o-carbomethoxyanilino)-s-triazine and 2.1426 gm. of 3,3'-diaminobenzidine were reacted together. The polymer obtained had an intrinsic viscosity of 0.049 in DMSO at 100° C.

(e) 25.33 gm. of 2 - diphenylamino-4,6-bis(ω-carboxy-n-pentylamino)-s-triazine and 10.71 gm. of 3,3'-diaminobenzidine were reacted together. The polymer obtained had an intrinsic viscosity of 0.480 in DMSO at 100° C. and a glass transition temperature of 182° C. Films which were cast from DMAC solution and cured were clear, tough and flexible.

(f) A copolymer was prepared by reacting .2173 gm. of 2 - diallylamino-4,6-bis(ω-carboxy-n-pentylamino) - s-triazine, 1.8473 gm. of 2-diethylamino-4,6-bis(ω-carboxy-n-pentylamino)-s-triazine and 1.072 gm. of 3,3'-diaminobenzidine. The polymer obtained had an intrinsic viscosity of 0.196 in DMSO at 100° C.

(g) 1.869 gm. of 2-chloro-4,6-bis(ω-carboxy-n-pentylamino)-s-triazine and 1.072 gm. of 3,3'-diaminobenzidine were reacted together. A moldable polymer was obtained.

(h) 1.772 gm. of 2-amino-4,6-bis(ω-carboxy-n-pentylamino)-s-triazine and 1.072 gm. of 3,3'-diaminobenzidine were reacted together. A moldable polymer was obtained which had a glass transition temperature of 148° C.

(i) 2.733 gm. of 2 - diphenylamino-4,6-bis(m-carbomethoxyanilino)-s-triazine and 1.072 gm. of 3,3'-diaminobenzidine were reacted together. The polymer obtained had an intrinsic viscosity of 0.139 DMSO at 100° C. and a glass transition temperature of 279° C.

(j) 2.252 gm. of 2 - diethylamino-4,6-bis(p-carbomethoxyanilino)-s-triazine and 1.072 gm. of 3,3'-diaminobenzidine were reacted together. The polymer obtained had an intrinsic viscosity of 0.150 in DMSO at 100° C. and a glass transition temperature of 230° C.

(k) 2.223 gm. of 2-methylphenylamino-4,6-bis(ω-carboxy-n-pentylamino)-s-triazine and 1.071 gm. of 3,3'-diaminobenzidine were reacted together. A moldable polymer was obtained which had an intrinsic viscosity of 0.263 in DMSO at 100° C.

EXAMPLE IV 120 gm. of polyphosphoric acid (84% by weight of $P_2O_5$) was added under a nitrogen atmosphere to a three necked flask equipped with a mechanical stirrer. The solution was heated with stirring and a nitrogen purge to 140° C. 2.14 gm. of 3,3'-diaminobenzidine was then added in small portions. After it was all dissolved, 3.82 gm. of 2-dimethylamino-4,6-bis(ω-carboxy - n - pentylamino) - s-triazine was added. The temperature was raised slowly to 200° C. and held at this temperature for 12 to 19 hours. After cooling to about 100° C. the reaction mixture was precipitated into 2 liters of distilled water. The mixture was filtered and the solid polymer was washed with 500 ml. of 10% $NaHCO_3$ in a Waring blender, followed by a water wash to a pH of 6 to 7.

After a final wash with methyl alcohol, the polymer was dried in a vacuum oven at 60–70° C. for 18 hours. The polybenzimidazole was obtained had a polymer melt temperature of 410° C.–420° C. and an intrinsic viscosity in DMSO at 100° C. of 0.303.

EXAMPLE V

Employing the procedure of Example IV, the following reactions were carried out to prepare the corresponding polybenzimidazoles.

(a) 2.70 gm. of 2 - dimethylamino - 4,6 - bis(carboxymethylamino)-s-triazine and 2.14 gm. 3,3'-diaminobenzidine were reacted in 120 gm. of (84% by weight $P_2O_5$) polyphosphoric acid. The polymer obtained had an inherent viscosity of 0.077 in DMSO at 100° C.

(b) 2.87 gm. of 2 - diphenylamino - 4,6 - bis(p - carbethoxyanilino)-s-triazine and 1.07 gm. of 3,3'-diaminobenzidine were reacted in 60 gm. of (84% by weight $P_2O_5$) polyphosphoric acid. The polymer obtained had an inherent viscosity of 0.087 in DMSO at 100° C.

(c) 4.274 gm. of 2 - dimethylamino - 4,6 - bis(o - carbomethoxyanilino)-s-triazine and 2.145 gm. 3,3'-diaminobenzidine were reacted in 120 gm. of (84% by weight $P_2O_5$) polyphosphoric acid. The polymer obtained had an inherent viscosity of 0.025 in DMSO at 100° C. and a glass transition temperature of 248° C.

EXAMPLE VI 2.44 gm. of 2 - diphenylamino - 4,6 - bis(p - carbophenoxyanilino)-s-triazine, 0.77 gm. 3,3'-diaminobenzidine and 2.2 gm. Dow Corning 710 silicone fluid were heated in a 25 ml. 3 necked flask for 2 hours at 290° C. with stirring under a nitrogen atmosphere. At 290° C. the reaction mixture goes through several phase changes, namely; liquid-solid-liquid, and finally to a solid. After cooling to room temperature, the polymer was placed in a Waring Blendor with 100 ml. of $CHCl_3$ and stirred rapidly. The ground polymer was washed well with several increments of fresh $CHCl_3$. Weight of the dried polymer was 2.14 gm., intrinsic viscosity in DMSO at 100° C. was 0.210. The polymer had a glass transition temperature of 329° C.

EXAMPLE VII 5.746 gm. of 2 - diphenylamino - 4,6 - bis(p - carboethoxyanilino)-s-triazine, 2.143 gm. 3,3'-diaminobenzidine and 6.40 gm. of Dow Corning 710 silicone fluid were heated in a 100 ml. 3 necked flask for about 5 hours at 290° C. The reaction mixture remained fluid throughout the reaction at 290° C. After cooling the polymer was ground and washed with $CHCl_3$ in a Waring Blendor. 6.25 gm. of dry polymer was collected which was soluble in DMF, and had an intrinsic viscosity in DMSO at 100° C. of 0.118.

4.0 gm. of this ground polymer was further heated in a polymer tube under a nitrogen atmosphere for about 16 hours at 330° C. The product was still soluble in DMF and had an intrinsic viscosity in DMSO at 100° C. of 0.208.

EXAMPLE VIII

Employing the procedure of Example II, the following reactions are carried out to prepare the corresponding polybenzimidazoles.

(a) 5.79 gm. of 2 - phenyl - 4,6 - bis(p - carbophenoxyanilino)-s-triazine and 2.14 gm. 3,3'-diaminobenzidine are reacted together. A moldable polybenzimidazole is obtained.

(b) 6.48 gm. of 2 - phthalimido - 4,6 - bis(p - carbophenoxyanilino)-s-triazine and 2.14 gm. 3,3'-diaminobenzidine are reacted together. A moldable polybenzimidazole is obtained.

(c) 6.96 gm. of 2 - diphenylamino - 4,6 - bis(p - carbophenoxyanilino)-s-triazine and 2.30 gm. of 3,3',4,4'-tetraminodiphenylether are reacted together. A moldable polybenzimidazole is obtained.

(d) 4.10 gm. of 2 - diethylamino - 4,6 - bis(ω - carboxy-n - pentylamino) - s - triazine and 1.38 gm. 1,2,4,5-tetraminobenzene are reacted together. A moldable polybenzimidazole is obtained.

(e) 6.48 gm. of 2 - N - phthalimido - 4,6 - bis(p-carbophenoxyanilino)-s-triazine and 2.78 gm. of 3,3',4,4'-tetraminodiphenylsulfone are reacted together. A moldable polybenzimidazole is obtained.

(f) 3.82 gm. of 2 - dimethylamino - 4,6 - bis(ω - carboxy - n - pentylamino) - s - triazine and 2.28 gm. of 3,3',4,4' - tetraminodiphenylmethane were reacted together. A moldable polybenzimidazole is obtained.

EXAMPLE IX

A polybenzimidazole of the composition in Example II of intrinsic viscosity 0.60 was dissolved in dimethyl acetamide at 30 weight percent concentration. One portion of this solution was used directly to prepare glass laminates while to the remaining solution 1% di-tert-butyl peroxide was added before laminating. The laminates were prepared by passing heat treated 112E fiberglass cloth through these solutions using a laboratory coater with the rolls set with a 10 mil gap. The coated fiberglass was air dried for 24 hours and then further dried in a vacuum oven at 80° C. for 2 hours. The prepreg was then cut into squares and laid up in the press to form a 16 ply laminate at 280° C./500 p.s.i. for 15 minutes. The laminate with the peroxide had a flexural strength which was higher than the flexural strength for the laminate without the peroxide.

DMAC solutions containing 10% by weight of this polybenzimidazole with and without addition of di-tert-butyl peroxide were cast on a polyethylene sheet. The films were dried in a vacuum oven at 80° C., stripped from the polyethylene and then cured at 200° C. for 10 minutes. The films containing the peroxide had a tensile strength and tensile modulus which were higher than the tensile strength and tensile modulus for the films containing no peroxide.

What is claimed is:

1. A polybenzimidazole consisting essentially of recurring units of the formula:

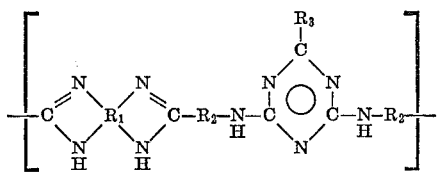

wherein
$R_1$ is a tetravalent radical containing at least one ring of six carbon atoms, said ring characterized by benzenoid unsaturation, the four amino groups being attached directly to separate carbon atoms in a 6 membered benzenoid ring of the $R_1$ radical and each pair of amino groups being attached to adjacent carbon atoms in a ring of the $R_1$ radical;
$R_2$ is a divalent aromatic hydrocarbon, aliphatic or cycloaliphatic radical; and
$R_3$ is hydrogen, amino, chloro, diarylamino, dialkylamino, alkylarylamino, dialkenylamino, anilino, phenyl or phthalimido.

2. A polybenzimidazole according to claim 1 wherein said $R_1$ group is

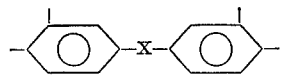

where X is O, S, $SO_2$, $CH_2$ or a carbon to carbon bond.

3. A linear polybenzimidazole according to claim 1 wherein said $R_1$ group is

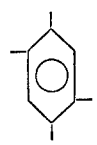

4. A polybenzimidazole according to claim 1 wherein $R_1$ is biphenyl.

5. A polybenzimidazole according to claim 1 wherein said $R_2$ is a divalent aromatic radical.

6. A polybenzimidazole according to claim 1 wherein said $R_2$ is a divalent aliphatic radical of from 1 to 10 carbon atoms.

7. A polybenzimidazole according to claim 1 wherein said $R_2$ is a phenylene group.

8. A polybenzimidazole according to claim 1 wherein said $R_3$ is an amine radical.

9. A polybenzimidazole according to claim 1 wherein said $R_3$ is a phthalimido radical.

10. A polybenzimidazole according to claim 1 wherein said $R_3$ is a phenyl radical.

11. A polybenzimidazole according to claim 1 wherein $R_1$ is

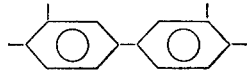

$R_2$ is $(CH_2)_5$,
$R_3$ is $-N(C_6H_5)_2$.

12. A linear polybenzimidazole as recited in claim 1 wherein
$R_1$ is

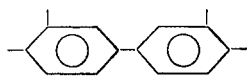

$R_2$ is

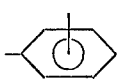

ortho, meta, or para,
$R_3$ is $N(C_6H_5)_2$.

13. A linear polybenzimidazole as recited in claim 1 wherein
$R_1$ is

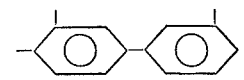

$R_2$ is $(CH_2)_5$,
$R_3$ is $N(C_2H_5)_2$.

14. A linear polybenzimidazole as recited in claim 1 wherein
$R_1$ is

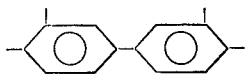

$R_2$ is

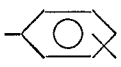

ortho, meta or para,
$R_3$ is $N(C_2H_5)_2$.

15. A shaped article comprising a polybenzimidazole according to claim 1.

References Cited

UNITED STATES PATENTS

| | | | |
|---|---|---|---|
| Re. 26,065 | 7/1966 | Marvel et al. | 260—47 |
| 3,433,772 | 3/1969 | Chenevey et al. | 260—78.4 |

WILLIAM H. SHORT, Primary Examiner

L. L. LEE, Assistant Examiner

U.S. Cl. X.R.

117—124 E, 126 GR, 132 B, 161 P; 161—197, 214; 260—30.8 DS, 32.6 N, 47 CP, 78 TF, 78.4 E, 249.5, 249.6, 249.8, 249.9

UNITED STATES PATENT OFFICE
CERTIFICATE OF CORRECTION

Patent No. __3,642,720__    Dated __February 15, 1972__

Inventor(s) __Raymond J. Kray and Roland A. E. Winter__

It is certified that error appears in the above-identified patent and that said Letters Patent are hereby corrected as shown below:

1. Column 2, line 65, that part of the structure "I$\overset{\overset{O}{\|}}{O}$C" should read "H$\overset{\overset{O}{\|}}{O}$C".

2. Column 5, lines 20-29, delete $H_2N$ and $HN_2$ from all the structures.

3. Column 8, line 34, "Blendor" should read "Blender".

4. Column 3, line 53, delete

"$C_6H_5NHCH_3$", "$(C_6H_5)_2NH$" and substitute therefor

"$C_6H_5NHCH_3$, $(C_6H_5)_2 NH$, $(CH_2=CHCH_2)_2 NH$"

5. Column 4, between lines 21 and 25, insert the integer "2" before the structure.

6. Column 4, line 30, insert the integer "2" before the formula.

Signed and sealed this 5th day of November 1974.

(SEAL)
Attest:

McCOY M. GIBSON JR.
Attesting Officer

C. MARSHALL DANN
Commissioner of Patents